3,663,464
POLYMERIC VEHICLES AS CARRIERS FOR SULFONIC ACID SALT OF NITROSUBSTITUTED AROMATIC AMINES

Paul M. Sawko, San Jose, Calif., assignor to the United States of America as represented by the Administrator of the National Aeronautics and Space Administration
No Drawing. Filed Aug. 13, 1970, Ser. No. 63,610
Int. Cl. C08d 13/08
U.S. Cl. 260—2.5 FP                          7 Claims

ABSTRACT OF THE DISCLOSURE

An intumescent agent is provided which contains the ammonium salt of 4-nitroaniline-2-sulfonic acid and a polymer of the mercaptan type which may contain disulfide linkages or polyoxyalkylene linkages. The adhesion and char resistance of such compositions can be further improved by the addition of epoxy resins.

---

The invention described herein was made by an employee of the United States Government and may be manufactured and used by or for the Government for governmental purposes without the payment of any royalties thereon or therefor.

BACKGROUND OF THE INVENTION

Field of the invention

Intumescent agent applied as a paint or the like to protect material from fire or heat damage.

Description of the prior art

Intumescent coatings are well known to those skilled in the art and provide a degree of protection from fire and heat when applied to the surface of an article. For instance they might be used as a paint on a heat shield for the temporary thermal protection of spacecraft, boosters and auxiliary facilities. They might be used to locate hydrogen and zero G fires and can be used for protecting crash survivable flight recorders in aircraft. They may be also used in protecting schools and other buildings against destruction by fire.

The agents known for this purpose in the past had a number of defects, particularly the lack of hydrolytic stability.

One type of composition consists of the sulfuric acid salt of para-nitroaniline dispersed in a nitro-cellulose vehicle. Such coatings may also include an acrylonitrile-butadiene-phenolic binder system. Many of the coatings depend upon the use of phosphorus containing salts as catalysts for intumescence. In addition these require carbon containing polymers to react with the phosphorus type catalyst. A low melting point resin must also be used to form a film over the carbon char so that the intumescent agent will release gas which is trapped by the resin film to expand the carbon char. Other types of known coatings containing para-nitroaniline-bisulfate and nitro-cellulose as well as coatings containing para-nitroaniline-bisulfate dispersed in an acrylonitrile-butadiene-phenolic modified rubber also show sensitivity to water.

Thus, most current intumescent materials are formulated with water sensitive materials. The general sequence for the reaction of such intumescent materials is quite critical and unless the formulation is carefully balanced, so that the desired reaction is achieved at the precise time, the protection will be lost.

In general, the prior art materials employed a catalyst such as monoammonium phosphate, diammonium phosphate, or ammonium phosphate which will decompose to form phosphoric acid ammonia. The acid then reacts with the carbon containing or char forming material such as glucose, erythritol, pentaerythritol or starches. This material decomposes to carbon and regenerates the acid. A low melting point resin must be present, such as a water soluble melamine-formaldehyde resin, which melts and forms a film over the carbon to control the film continuity. Finally, blowing agents must be present to release gases which cause the carbon to foam. The decomposition temperature of each of the reactants is quite important to the overall operation of the coating as well as the stability of each agent to an environmental condition to maintain this intumescent potential.

The intumescent coatings heretofore known are so sensitive to water and high humidity that exposure to these conditions upsets the critical variables such as decomposition and reaction temperatures. Most of the disadvantages associated with current intumescent materials are thus due to their formation around water soluble agents since many of the catalysts, carbon forming materials, resins and blowing agents are water sensitive.

SUMMARY OF THE INVENTION

According to the present invention it has been found that the ammonium salt of 4-nitroaniline-2-sulfonic acid having the formula:

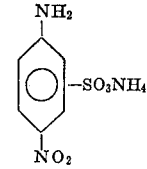

can be dispersed in a liquid mercaptan terminated polymer having a molecular weight of from 600 to 8000 to yield a paint-like material having intumescent qualities and which is highly resistant to water or moisture. From 20 to 95% of the sulfonic salt must be used based on the weight of the polymer.

The mercaptan terminated polymer can be either one which contains disulfide linkages or one which contains polyoxyalkylene linkages within the molecule.

Typical of the former are polysulfide mercaptans containing repeating bis(ethylene oxide)methane groups having the following general formula:

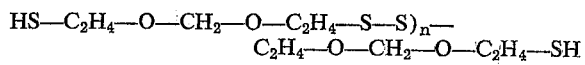

In this formula $n$ may vary from 6 to 42.

Another type of mercaptan terminated polymer does not contain disulfide linkages but does contain polyoxyalkylene units. Such polymers have the following general formula:

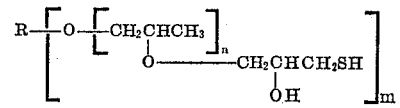

$n$ may vary from 1 through 25 and $m$ from 2 or 3 and R is a lower aliphatic hydrocarbon radical.

Such compositions can be further improved by the substitution of an epoxy resin for a portion of the mercaptan terminated polymer which increases the adhesion and weathering properties of the composition. The amount of the epoxy resin can vary from 0 to 90% based on the amount of mercaptan terminated polymer.

The epoxy resins may be of the epichlorohydrin-Bisphenol A types typified by commercial products such as Epon 828 (Shell Chemical Co.) and D.E.R. 331 (Dow Chemical Co.) or they can be of the epoxy-Novolac types such as DEN-438 (Dow Chemical Co.). When epoxy resins are used, an amine curing agent or catalyst is employed as is well known to those skilled in the art and normally 1 or 2 parts of the amine would be used per 10 parts of the epoxy resin on a weight basis.

A metal oxide curing agent is required with both the disulfide and the non-disulfide mercaptan polymers whenever an epoxy resin (and epoxy curing agent) is absent from the composition. When an epoxy resin and the usual epoxy curing agent are used, use of the metal oxide curing agent is optional. This can be 5 to 10 parts of a metal oxide such as lead dioxide or tellurium dioxide per 100 parts by weight of polymer.

A solvent is ordinarily employed in the formulation but the nature of the solvent is not critical. Methyl ethyl ketone, upper and lower homologs of methyl ethyl ketone, aromatic solvents such as toluene and xylene, lower aliphatic chlorinated solvents such as methyl chloride, esters such as butyl acetate, and mixtures of such solvents may be used.

The compositions of the present invention after dispersion and blending of required components are applied to a substrate such as steel or aluminum by spraying or other typical means to desired thicknesses. The compositions air dry overnight to tough, adherent coatings stable to high humidity environments. These coatings, when exposed to heat or flame, function as intumescent, thermal protection coatings. The coatings intumesce or swell to about 20 to 60 times original coating thickness providing a tough, integral, insulating char for protection of substrates from heat or flames. The temperature required to activate the intumescent process occurs at about 300° to 350° C.

It has been found tht polymers with glass transition temperatures (Tg) at or below room temperature must be used or intumescence will not occur or be seriously impaired. In addition, the polymer must have some degree of thermal decomposition below the decomposition temperature of the intumescent salt. For example the polymercaptan terminated polymers have a Tg of minus 57° C. If one attempted to use 100 percent epoxy resin as the polymeric carrier for the sulfonic salt, intumescence would be destroyed. Epoxy resins have Tg above room temperature (about 50° C.), so that quantitative limits must be established to balance mechanical and intumescent properties. Thus not over 90% of the epoxy resin should be used based on the amount of the mercaptan polymer.

Various fillers can be added to the paint. Preferably these are in the form of inert fibers such as silicon dioxide or carbon fibers.

DESCRIPTION OF THE PREFERRED EMBODIMENTS

The following non-limiting examples illustrate preferred embodiments of the invention:

Example 1.—A typical composition consisted of 14.1 parts by weight of a polysulfide mercaptan terminated polymer (average molecular weight of 1000, average viscosity at 25° C. of 10 poise, 6 percent mercaptan with 2 percent crosslinking) available as LP-3 from Thiokol Chemical Corp. It can be represented as

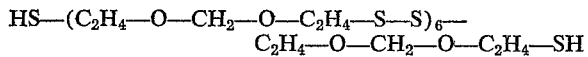

To this is added 57 parts by weight of the ammonium salt of 4-nitroaniline-2-sulfonic acid, and 28.9 parts by weight of methyl ethyl ketone. This composition is dispersed in a pebble mill for 4 hours or a high kinetic dispersion unit for 20 minutes to provide a useful dispersion. To this dispersion is added 18.8 parts by weight of Epon 828, an epoxy resin of the epichlorohydrin-Bisphenol A type (average molecular weight of 380, typical epoxide equivalent of 185-192 and viscosity of 100-160 poises), prepared as a 75 percent solution in an aromatic hydrocarbon such as toluene. To these components is added 5.6 parts by weight of a 50 percent solution of amine catalyst (tri-dimethyl aminomethyl phenol) in an aromatic hydrocarbon such as toluene.

The coating composition thus prepared is sprayed on cold rolled steel substrate at 30 mils dry film thickness and air dried overnight to a tough, adhering coating. A series of these coatings on cold rolled steel were exposed to an environment of 100° F. and 90 percent relative humidity for 5 continuous weeks. The linear intumescence was determined at weekly intervals by heating in a preheated oven of 350° C. for 20 minutes, just over the decomposition temperature of the intumescent salt. The linear expansion remained unaffected, functioning between 50 to 60 times original thickness.

The thermal protection resulting from intumescence of the coating was determined. A heating rate of 10 to 11 B.t.u./ft.²-sec. is applied to a 3-inch by 2-inch by 1/16-inch cold rolled steel panel to which is attached various thicknesses (30, 60, 90 mils) of the coating. The heat is obtained by the combustion of JP-4 fuel fire impinging on the coating surface during the test. The time-temperature history is measured by thermocouple attached to the backface of the specimen. Times to reach, for example, a backface temperature of 200° C. of 2 to 10 minutes have been recorded, depending upon initial coating thickness.

Example 2.—Another composition, varying the type of polysulfide mercaptan terminated polymer (average molecular weight of 4000, viscosity of 400 poises, and 2.2 percent mercaptan with 2 percent crosslinking), as the only change from Example 1, was prepared and tested with similar results. This polymer is available as LP-2 from Thiokol Chemical Corp. with this typical structure:

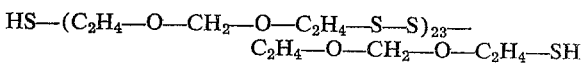

Example 3.—Another composition, replacing, as the only change from Example 1, the polysulfide mercaptan terminated polymer with DPM-1002, a polymercaptan polymer without disulfide linkage having a viscosity of 60 poises, a mercaptan value of 0.35 meq. SH per gram, and a formula corresponding to

wherein $n=20-25$ and R is a lower aliphatic hydrocarbon, was found to provide similar excellent humidity stability.

Example 4.—A composition varying from Example 1 the ratio of polysulfide mercaptan terminated polymer to epoxy was formulated. A composition of 3.6 parts by weight of LP-3, 59.5 parts by weight of the ammonium salt of 4-nitroaniline-2-sulfonic acid, and 36.9 parts by weight of the methyl ethyl ketone solvent was dispersed according to Example 1. To this is added 43.1 parts by weight of the epoxy resin prepared as in Example 1. The coating blend was catalyzed with 13 parts by weight of a 50 percent solution of tri-dimethyl aminomethyl phenol in toluene. Similar results achieved in Example 1 were found.

Example 5.—A formulation, similar to Example 1, except the intumescent salt ratio was varied, performed well when prepared and tested similarly as Example 1. Here, 23.8 parts by weight of the LP-3 polymer, 47.2 parts by weight of the ammonium salt of 4-nitroaniline-2-sulfonic acid, and 29 parts by weight of methyl ethyl ketone solvent were dispersed. To this was added 31.6 parts by weight of epoxy resin Epon 828 prepared as a 75 percent solution in toluene. The coating was catalyzed with 9.5 parts by weight of a 50 percent solution of tri-dimethyl aminomethyl phenol in toluene.

Example 6.—Another composition replacing the epichlorohydrin-Bisphenol A type epoxy resin with an epoxy-novolac type having an epoxy equivalent of 176–181 (DEN 438 from Dow Chemical Co.) as the only change from Example 1 was successfully prepared and tested with similar results as Example 1.

Example 7.—Another composition, replacing as the only change from Example 1, the amine catalyst from the tri-dimethyl aminoethyl phenol to 1,6 hexanediamine was successfully prepared and performed satisfactorily when tested as in Example 1.

Example 8.—A composition of 100 parts by weight of LP-31 (Thiokol Chemical Corp.), a polysulfide mercaptan terminated polymer (average molecular weight of 8000, viscosity of 800 poise, 1.1 percent mercaptan and 0.5 percent crosslinking) represented by

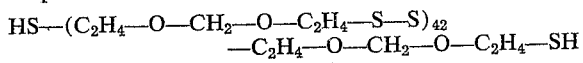

was dispersed with 100 parts by weight of the ammonium salt of 4-nitroaniline-2-sulfonic acid, and 100 parts by weight of methyl ethyl ketone for solvent in a pebble mill or high-speed kinetic dispersion unti. To this is added 15 parts by weight of a 50 percent paste of lead dioxide in methyl ethyl ketone. The coating is applied and tested as in Example 1 with similar performance.

Example 9.—Other compositions similar to Example 1 were prepared except that 7.2 parts of a silicon dioxide fiber (sold under the trade name Refrasil) was added under high-speed kinetic dispersion. The quantity of fiber was varied from 1 to 20 parts and the length of the fiber from 1/32" to 1/4". Thermal and environmental results are similar to Example 1 with some improvement in toughness noted and adhesion to cylindrical surfaces. The type of fiber (silicon dioxide, carbon, synthetic) can also be varied with effective results.

Example 10.—A formulation similar to Example 1, except a lower intumescent salt ratio was utilized, responded in a similar fashion as Example 1 when prepared and tested. Here, 20 parts by weight of the ammonium salt of 4-nitroaniline-2-sulfonic acid, 80 parts by weight of the LP-3 polymer and 20 parts of methyl ethyl ketone were dispersed. Added to this was 106.4 parts of the epoxy resin (Epon 828) prepared as a 75% solution in toluene. The coating was catalyzed with 32 parts by weight of a 50% solution of tri-(dimethyl amino-methyl) phenol in toluene.

Example 11.—A composition similar to Example 8, except a polymercaptan polymer without disulfide linkages in the polymer backbone composed of polyoxyalkylene units was used (DION, DPM-1002 from Diamond Shamrofk Chemical Co.). Similar performance to Example 8 was noted. A composition of 100 parts by weight of the DION, DPM-1002 polymercaptan polymer, 100 parts by weight of the ammonium salt of 4-nitroaniline-2-sulfonic acid, and 100 parts by weight of methyl ethyl ketone are dispersed in a pebble mill. To this is added 10 parts by weight of a 50% paste of manganese dioxide in methyl ethyl ketone.

I claim:
1. As an intumescent coating composition a mixture containing from 20 to 95% by weight of the ammonium salt of 4-nitroaniline-2-sulfonic acid, the balance of said composition being a polymer component, said polymer component containing:
    (a) from 10 to 100% of a mercaptan terminated polymer having a molecular weight of from 600 to 8000 and
    (b) from 0 to 90% of an epoxy resin with a curing agent for said epoxy resin.
2. The composition of claim 1 wherein the mercaptan terminated polymer has the composition:

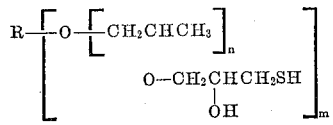

wherein $n$ is a number from 1–25, $m$ is a number from 2–3, and R is a lower aliphatic hydrocarbon.
3. The coating composition of claim 1 wherein the mercaptan terminated polymer has the composition:

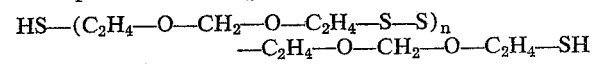

wherein $n$ is a number from 6 to 42.
4. The composition of claim 1 wherein the polymer component consists entirely of said mercaptan terminated polymer together with a metal oxide curing agent.
5. The composition of claim 1 wherein the mercaptan terminated polymer is a polysulfide linked polymer having an average molecular weight of about 1000 and containing about 6% by weight of mercaptan sulfur.
6. The composition of claim 1 wherein a polysulfide mercaptan terminated polymer is employed having an average molecular weight of about 1000.
7. The composition of claim 1 having an inert fiber filler therein.

References Cited
UNITED STATES PATENTS

| | | | |
|---|---|---|---|
| 3,539,474 | 11/1970 | Sommer, Jr. | 260—2.5 |
| 3,535,130 | 10/1970 | Parker et al. | 106—15 |

DONALD E. CZAJA, Primary Examiner

M. I. MARQUIS, Assistant Examiner

U.S. Cl. X.R.

106—15 FP; 117—136; 252—378 R; 260—31.2 R, 32.8 R, 32.8 EP, 33.6 R, 33.6 EP, 33.8 R, 33.8 EP, 37 R, 45.9 R, 79, 79.1, DIG. 24